US008638862B2

(12) United States Patent
Sun

(10) Patent No.: US 8,638,862 B2
(45) Date of Patent: Jan. 28, 2014

(54) METHODS AND SYSTEMS FOR UPSAMPLING FILTER DESIGN

(75) Inventor: Shijun Sun, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1848 days.

(21) Appl. No.: 11/530,853

(22) Filed: Sep. 11, 2006

(65) Prior Publication Data

US 2007/0031065 A1 Feb. 8, 2007

Related U.S. Application Data

(63) Continuation-in-part of application No. 11/347,539, filed on Feb. 3, 2006, now Pat. No. 8,175,168.

(60) Provisional application No. 60/777,947, filed on Feb. 28, 2006, provisional application No. 60/806,929, filed on Jul. 10, 2006, provisional application No. 60/663,161, filed on Mar. 18, 2005, provisional application No. 60/683,060, filed on May 20, 2005, provisional application No. 60/686,676, filed on Jun. 1, 2005.

(51) Int. Cl.
*H04N 7/12* (2006.01)

(52) U.S. Cl.
USPC .................................................. 375/240.29

(58) Field of Classification Search
USPC ............ 375/240.01, 240.26, 240.29; 348/458
IPC ........................................................ H04N 7/12
See application file for complete search history.

(56) References Cited

U.S. PATENT DOCUMENTS

| 6,057,884 A | 5/2000 | Chen et al. |
| 6,728,317 B1 | 4/2004 | Demos |
| 2002/0090028 A1 | 7/2002 | Comer et al. |
| 2007/0118794 A1 | 5/2007 | Hollander et al. |

OTHER PUBLICATIONS

Gary Sullivan, "Resampling filters for SVC Upsampling", JVT-R066, Joint Video Team (JVT) of ISO/IEC MPEG & ITU-T VCEG eighteenth meeting, Bangkok, Jan. 2006.

J. Vieron, E. Francois and V. Bottreau, "CE 2: Interlaced coding", JVT-S302, Joint Video Team (JVT) of ISO/IEC MPEG & ITU-T VCEG nineteenth meeting, Geneva, Apr. 2006.

E. Francois and J. Vieron, "Core Experiments on Extended Spatial Scalability (CE-6)", JVT-P306, Joint Video Team (JVT) of ISO/IEC MPEG & ITU-T VCEG sixteenth meeting, Poznan, Jul. 2005.

S. Sun, and E. Francois, "Extended Spatial Scalability with Picture-Level Adaptation", Joint Video Team (JVT) of ISO/IEC MPEG & ITU-T VCEG (ISO/IEC JTC1/SC29/WG11 and ITU-T SG16 Q.6) $15^{th}$ Meeting: Busan, DR, Apr. 16-22, 2005.

Chinese Office Action 2006-80016560 corresponding to U.S. Appl. No. 11/347,539 which has technical similarities to the present application.

(Continued)

*Primary Examiner* — Young Lee
(74) *Attorney, Agent, or Firm* — David C. Ripma

(57) ABSTRACT

Aspects of the present invention relate to systems, methods and devices for upsampling images and design of upsampling filters. Some aspects relate to a determination of a phase offset position in a higher resolution picture relative to a lower resolution picture. Interpolation filter coefficients for some filters may then be selected based on the filter offset. Other aspects relate to selection of coefficients for filters that are not dependent on the phase offset. In certain implementations, a weighting factor may be used to combine the effects of a phase-offset-dependent filter and an independent filter.

20 Claims, 4 Drawing Sheets

(56) References Cited

OTHER PUBLICATIONS

U.S. Appl. No. 11/350,000—Final Office Action dated Jul. 21, 2010.
U.S. Appl. No. 11/350,000—Non-Final Office Action dated Nov. 10, 2009.
U.S. Appl. No. 11/350,000—Final Office Action dated May 28, 2009.
U.S. Appl. No. 11/350,000—Non-Final Office Action dated Oct. 8, 2008.
Edouard Francois, Extended spatial scalability, International Organisation for Standardisation Organisation Internationale de Normalisation, ISO/IEC JTC1/SC29/WG11, Coding of Moving Pictures and Audio, ISO/IEC JTC1/SC29WG11, MPEG2005/M11669, Jan. 2005, Hong Kong, China.
International Organisation for Standardisation, Organisation Internationale de Normalisation, Coding of Moving Pictures and Audio, ISO/IEC JTC1/SC29/WG11/N6898, Hong Kong, Jan. 2005.
Joint Video Team (JVT) of ISO/IEC MPEG & ITU-T VCEG, (ISO/IEC JTC1/SC29WG11 and ITU-T SG16 Q.6). Working Draft 1.0 of 14498-10:200x/AMD1 Scalable Video Coding International Organization for Standardization, Organisation Internationale Normalisation, Coding of Moving Pictures and Audio, ISO/IEC JTC 1/SC 29/WG 11 N6901, Jan. 2005, Hong Kong, China *relevant sections 5 and 6*.
Ken Turkowski, "Filters for Common Resampling Tasks". Graphics Gems I, Academic Press. Apple Computer, Apr. 1990.

METHODS AND SYSTEMS FOR UPSAMPLING FILTER DESIGN

RELATED REFERENCES

This application claims the benefit of U.S. Provisional Patent Application No. 60/777,947, entitled "Methods and Systems for Upsampling Filter Design," filed Feb. 28, 2006, invented by Shijun Sun; this application also claims the benefit of U.S. Provisional Patent Application No. 60/806,929, entitled "Methods and Systems for Texture Upsampling," filed Jul. 10, 2006, invented by Shijun Sun; this application is also a continuation-in-part of U.S. patent application Ser. No. 11/347,539, entitled "Methods and Systems for Picture Upsampling," invented by Shijun Sun filed Feb. 3, 2006, now U.S. Pat. No. 7,175,168, which claims the benefit of U.S. Provisional Patent Application No. 60/663,161, entitled "Extended spatial scalability with picture-level adaptation," filed Mar. 18, 2005, invented by Shijun Sun; which also claims the benefit of U.S. Provisional Patent Application No. 60/683,060, entitled "Direct interpolation for up-sampling in extended spatial scalability," filed May 20, 2005, invented by Shijun Sun; and which also claims the benefit of U.S. Provisional Patent Application No. 60/686,676, entitled "Deblocking filter method with reduced complexity for spatial scalable video coding," filed Jun. 1, 2005, invented by Shijun Sun.

FIELD OF THE INVENTION

Embodiments of the present invention comprise methods and systems for upsampling filter design. Some embodiments comprise upsampling filter design with cubic splines.

BACKGROUND

Some embodiments of the present invention are related to the Scalable Video Coding (SVC) extension of H.264/AVC. In the current SVC extension of H.264 (in Joint Draft version 4, JVT-Q202), the texture signal of a base layer is upsampled using a set of 6-tap filters before it is used as a prediction signal for the enhancement layer. The 6-tap filters are derived from the Lanczos-3 function and defined in a pre-fixed filter table.

SUMMARY

Some embodiments of the present invention are related to the Scalable Video Coding (SVC) extension of H.264/AVC. More specifically, some embodiments comprise a filter design related to the texture upsampling in spatial scalable video coding.

Embodiments of the present invention comprise one or more upsampling filters for image interpolation. Some embodiments comprise a matrix-based representation of a set of 6-tap filters, which have a very similar frequency response to that of Lanczos3 filter. Some embodiments may also comprise a matrix-based representation of a new set of 4-tap filters, which may obtain a wider pass-band than the popular Catmull-Rom filter. Other embodiments comprise a combination of filters controlled by a weighting factor. In some embodiments a combination of filters with phase-related coefficients may be used.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 3:
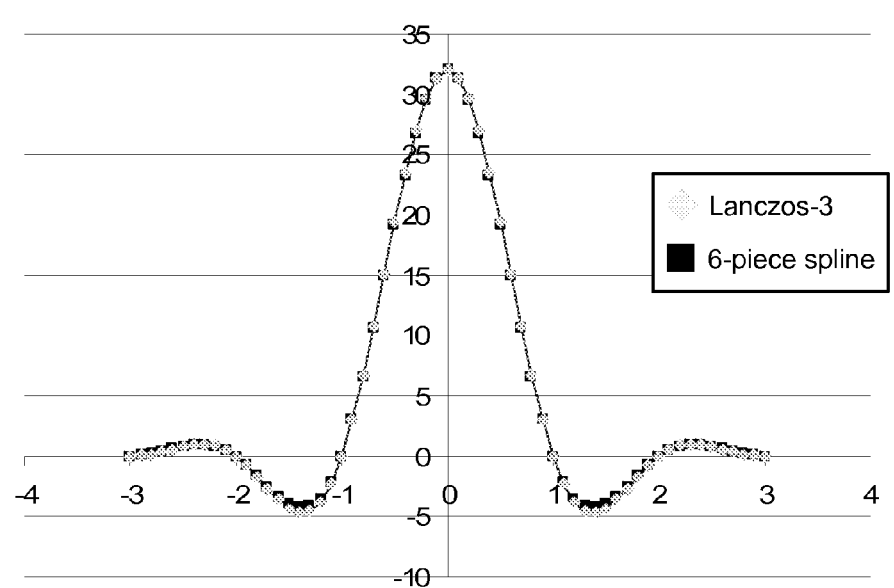
Figure 4:
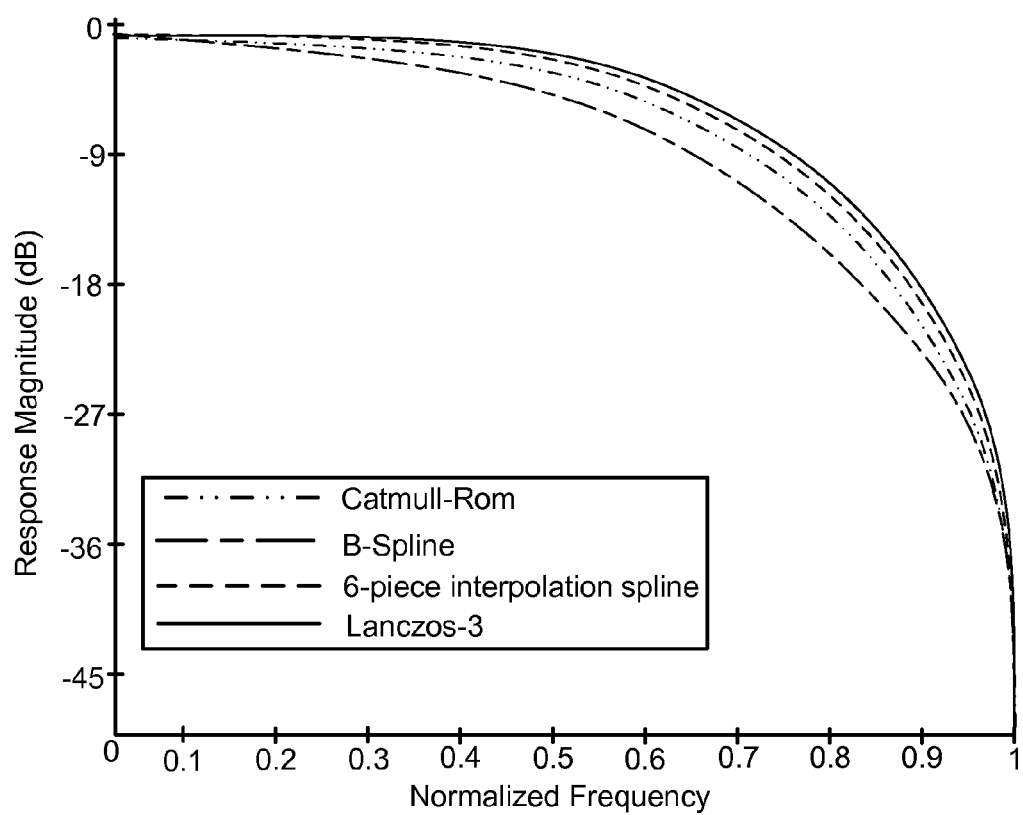
Figure 5:
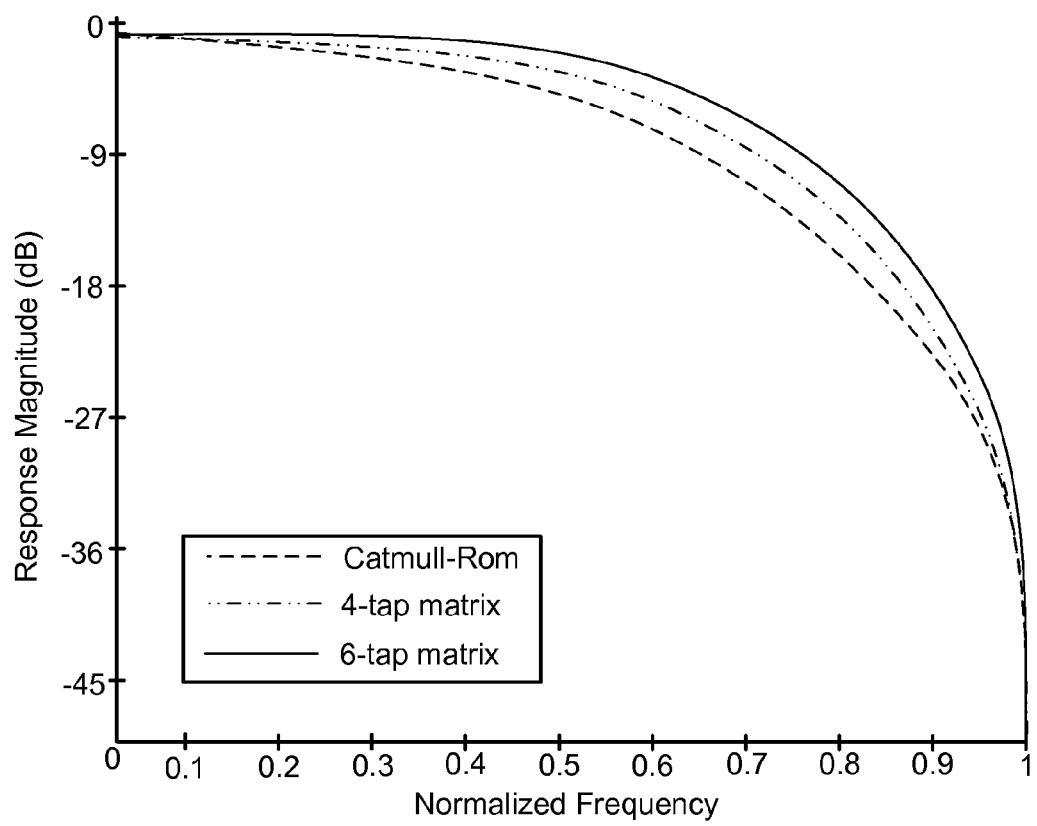

FIG. 3 a diagram showing a comparison between filter coefficients;

FIG. 4 is a diagram showing a frequency response of a 6-tap cubic filter and Lanczos-3 filter as well as the 4-piece cubic filters at phase position of ½; and FIG. 5 is a diagram showing a frequency response of a 4-tap cubic filter, a 6-tap cubic filter and a Catmull-Rom filter at phase position of ½.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

H.264/MPEG-4 AVC [Joint Video Team of ITU-T VCEG and ISO/IEC MPEG, "Advanced Video Coding (AVC)—4$^{th}$ Edition," ITU-T Rec. H.264 and ISO/IEC 14496-10 (MPEG4—Part 10), January 2005], which is incorporated by reference herein, is a video codec specification that is related to embodiments of the present invention. Spatial scalability is supported by the Scalable Video Coding (SVC) extension of H.264/MPEG-4 AVC.

The SVC extension of H.264/MPEG-4 AVC [Working Document 1.0 (WD-1.0) (MPEG Doc. N6901) for the Joint Scalable Video Model (JSVM)], which is incorporated by reference herein, is a layered video codec in which the redundancy between spatial layers is exploited by inter-layer prediction mechanisms.

Some embodiments of the present invention relate to the Scalable Video Coding Extension of H.264/AVC. Some embodiments relate to filtering to address a problem of picture upsampling for spatial scalable video coding. More specifically, some embodiments of the present invention provide an upsampling procedure that is designed for the Scalable Video Coding extension of H.264/MPEG-4 AVC, especially for the Extended Spatial Scalable (ESS) video coding feature adopted in April 2005 by JVT (Joint Video Team of MPEG and VCEG).

Currently, JSVM WD-1.0 [MPEG Doc. N6901], which is incorporated by reference herein, only addresses dyadic spatial scalability, that is, configurations where the ratio between picture width and height (in terms of number of pixels) of two successive spatial layers equals 2. This obviously will be a limitation on more general applications, such as SD to HD scalability for broadcasting.

For the purposes of this specification and claims, the term "picture" may comprise an array of pixels, a digital image, a subdivision of a digital image, a data channel of a digital image or another representation of image data.

Figure 1:
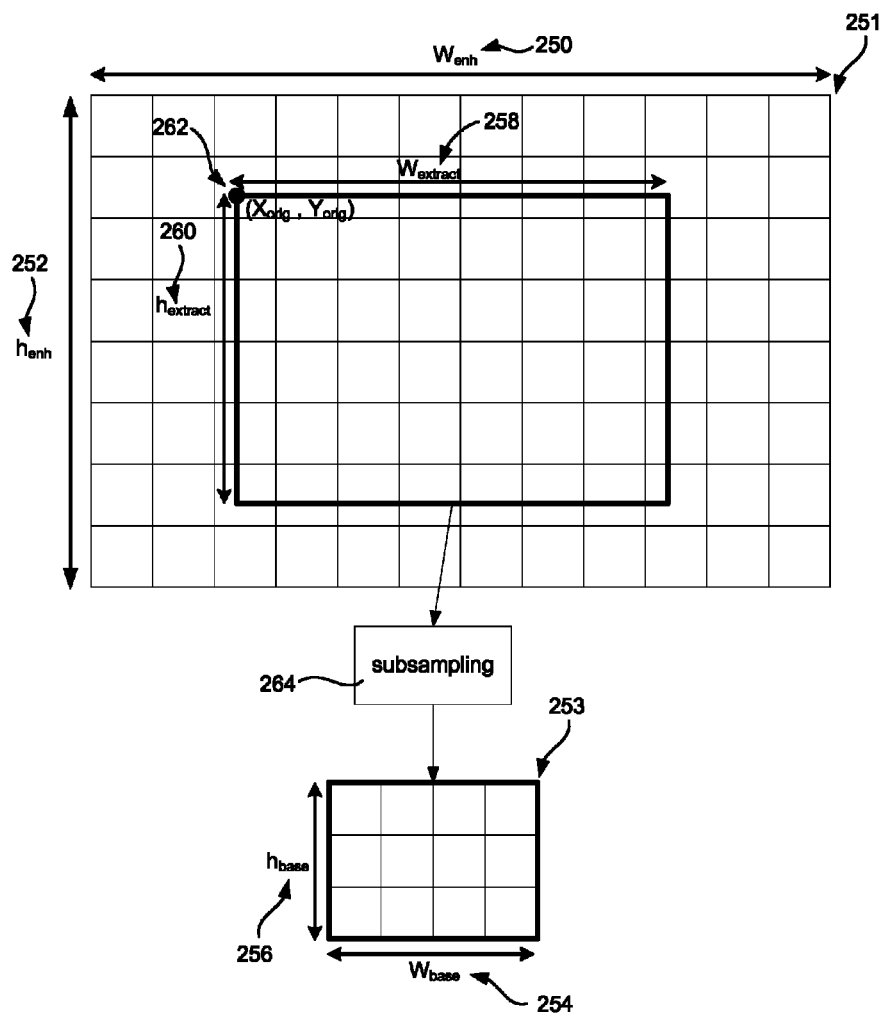
FIG. 1 is a diagram showing the geometric relationship between a base spatial layer and an enhancement spatial layer in some embodiments of the present invention.

FIG. 1 shows two pictures corresponding to an image picture:
Embodiments of the present invention relate to two or more successive spatial layers, a lower layer (considered as base layer) 253 and a higher layer (considered as enhancement layer) 251. These layers may be linked by the following geometrical relations (shown in FIG. 1). Width 250 and height 252 of enhancement layer pictures may be defined as $w_{enh}$ and $h_{enh}$, respectively. In the same way, dimensions of a base layer picture may be defined as $w_{base}$ 254 and $h_{base}$ 256. The base layer 253 may be a subsampled 264 version of a sub-region of an enhancement layer picture 251, of dimensions $w_{extract}$ 258 and $h_{extract}$ 260, positioned at coordinates 262 ($x_{orig}$, $y_{orig}$) in the enhancement layer picture coordinate system. Parameters ($x_{orig}$, $y_{orig}$, $w_{extract}$, $h_{extract}$, $w_{base}$, $h_{base}$) define the geometrical relations between a higher layer picture 251 and a lower layer picture 253.

Cubic Splines

Splines are piecewise polynomials. Typically, cubic spline filters with four pieces or intervals have been applied in many applications. One such filter is known as the "B-spline" filter as represented in Eq. 1. Among piecewise cubic functions, the B-spline is special because it has continuous first and second derivatives.

$$f_B(x) = \frac{1}{6}\begin{cases} -3(1-|x|)^3 + 3(1-|x|)^2 + 3(1-|x|) + 1 & |x| \leq 1 \\ (2-|x|)^3 & 1 \leq |x| \leq 2 \\ 0 & \text{otherwise} \end{cases} \quad (1)$$

Another popular piecewise cubic filter, the Catmull-Rom filter, has the value zero at x=−2, −1, 1, and 2, which means it will interpolate the samples when used as a reconstruction filter.

$$f_C(x) = \frac{1}{2}\begin{cases} -3(1-|x|)^3 + 4(1-|x|)^2 + (1-|x|) & |x| \leq 1 \\ (2-|x|)^3 - (2-|x|)^2 & 1 \leq |x| \leq 2 \\ 0 & \text{otherwise} \end{cases} \quad (2)$$

For the application of resampling images, Mitchell and Netravali recommended one partway between the previous two filters. It is simply a weighted combination of the previous two filters with b and c as the weighting factors (b+c=1).

$$f_M(x) = b \cdot f_B(x) + c \cdot f_C(x) \quad (3)$$

Adaptive Upsampling

Figure 2:
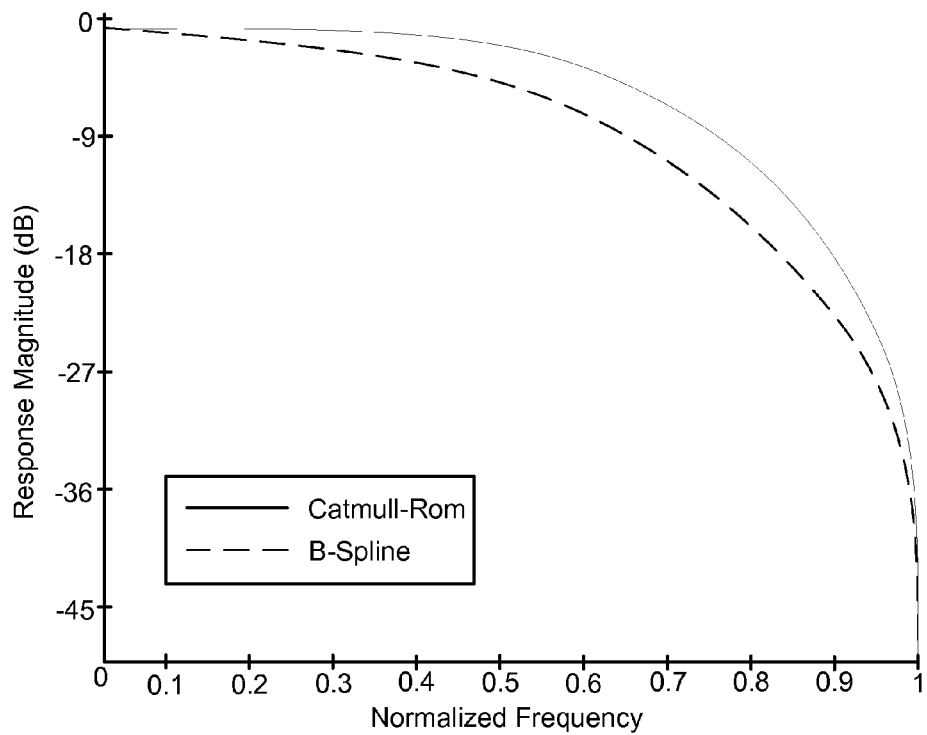
FIG. 2 is a diagram showing the frequency response of a cubic B-spline and a Catmull-Rom cubic at phase position of ½.

Adaptive upsampling may be applied for spatial scalability video coding. The Mitchell-Netravali filter in adaptive image upsampling has been proposed for the SVC standard. The adaptive filter selection can be achieved by adjusting the weighting factors. As shown in FIG. 2, the cubic B-spline tends to blur the signals more than the Catmull-Rom cubic does. For example, at a normalized frequency of 0.7, the B-spline is roughly 4.5 dB below the Catmull-Rom. And the size of this gap can be used to represent the flexibility or dynamic range of the adaptive filter design.

6-Tap Cubic-Spline Interpolation Filter

In the current SVC extension of H.264 (in Joint Draft version 4, JVT-Q202), the texture signal of a base layer is upsampled using a set of 6-tap filters before it is used as a prediction signal for the enhancement layer. The 6-tap filters are derived from the Lanczos-3 function and defined in a pre-fixed filter table.

Inspired by the 4-piece cubic functions, which give us the 4-tap filters, some 6-piece cubic splines were studied. These splines can yield 6-tap filters that have similar frequency response with that of the Lanczos-3 filter.

The 6-piece function may be described as:

$$f_{S6}(x) = \begin{cases} f_1(x) & |x| \leq 1 \\ f_2(x) & 1 \leq |x| \leq 2 \\ f_3(x) & 2 \leq |x| \leq 3 \\ 0 & \text{otherwise} \end{cases} \quad (4)$$

By requiring the following conditions including $C^1$ and $C^2$ conditions between pieces of splines, $f_1(0)=1, f_1(1)=0, f_2(2)=0, f_3(3)=0,$ $f_1'(0)=0, f_3'(3)=0,$ $f_1(1)=f_2(1), f_2(2)=f_3(2),$ $f_1'(1)=f_2'(1), f_2'(2)=f_3'(2),$ $f_1''(1)=f_2''(1), f_2''(2)=f_3''(2) \quad (5)$ we can get the following solution for the 6-piece spline as an interpolation filter $$f_{S6}(x) = \frac{1}{5}\begin{cases} -6(1-|x|)^3 + 7(1-|x|)^2 + 4(1-|x|) & |x| \leq 1 \\ 3(2-|x|)^3 - 2(2-|x|)^2 - (2-|x|) & 1 \leq |x| \leq 2 \\ -(3-|x|)^3 + (3-|x|)^2 & 2 \leq |x| \leq 3 \\ 0 & \text{otherwise} \end{cases} \quad (6)$$

For a relative phase offset position 0<=x<1, this kernel produces a 6-tap FIR filter with tap values given by the following matrix equation $$\frac{1}{5} * [1 \quad x \quad x^2 \quad x^3] * \begin{bmatrix} 0 & 0 & 5 & 0 & 0 & 0 \\ 1 & -4 & 0 & 4 & -1 & 0 \\ -2 & 7 & -11 & 7 & -2 & 1 \\ 1 & -3 & 6 & -6 & 3 & -1 \end{bmatrix} \quad (7)$$

Actually, it is sufficient to consider only the range of x from 0 to ½, since the FIR filter kernel for x is simply the FIR filter kernel for 1-x in reverse order. It is clearly shown in FIG. 3 (a comparison between the filter coefficients based on Eq-7 and Lanczos-3) that Eq-7 is a very good approximation of the Lanczos-3 function.

As shown in FIG. 4, the new 6-piece cubic filter gives less-blurred signals than the Catmull-Rom filter. For example, at normalized frequency of 0.7, the new 6-tap filter is roughly 2 dB above the Catmull-Rom. And it has been observed that the filters given in Eq-7 have very similar frequency response with the existing 6-tap Lanczos-3 filters. So, Eq-7 can potentially be used as a closed-form representation for the upsampling filters in the SVC extension.

Embodiments of the present invention may comprise a weighted combination of the three cubic spline functions.

$$F_S(x) = b \cdot f_B(x) + c \cdot f_C(x) + s \cdot f_{S6}(x) \qquad (8)$$

with (b+c+s)=1.

Since the new 6-tap filter potentially gives sharper images, the new combination as in Eq-8 potentially can provide more flexible filter design solutions with increased dynamic range.

One special option is to have c=0 in Eq-8, so Eq-8 can become a weighted combination of the B-spline and the newly proposed filter. When s=0, Eq-8 will simply become the Mitchell-Netravali filter. When b=0, Eq-8 becomes a weighted combination of Catmull-Rom and the new 6-tap filter.

Integerization and Dynamic Range Control

Meanwhile, there is also a simpler option. First, we can pre-calculate the cubic filters for various phases as fixed-point numbers (for example 8-bit numbers) and stored in look-up-tables. Tables 1-3 show the filters derived for 16 phase positions from the three cubic functions, respectively. We can also represent the weighting parameters as fixed-point numbers (for example 6-bit numbers) and signal them in the bit-streams. The desired filter coefficients can then be calculated and rounded to fixed-point numbers (for example 6-bit numbers) for the interpolation process.

TABLE 1

Filter coefficients based on 4-piece cubic B-Spline

| | (6-tap) interpolation filter coefficients | | | | | |
|---|---|---|---|---|---|---|
| phase | e[−2] | e[−1] | e[0] | e[1] | e[2] | e[3] |
| 0 | 0 | 21 | 85 | 21 | 1 | 0 |
| 1/16 | 0 | 18 | 85 | 26 | −1 | 0 |
| 2/16 | 0 | 14 | 83 | 30 | 1 | 0 |
| 3/16 | 0 | 11 | 81 | 35 | 1 | 0 |
| 4/16 | 0 | 9 | 78 | 40 | 1 | 0 |
| 5/16 | 0 | 7 | 75 | 46 | 0 | 0 |
| 6/16 | 0 | 5 | 71 | 51 | 1 | 0 |
| 7/16 | 0 | 4 | 66 | 56 | 2 | 0 |
| 8/16 | 0 | 3 | 61 | 61 | 3 | 0 |
| 9/16 | 0 | 2 | 56 | 66 | 4 | 0 |
| 10/16 | 0 | 1 | 51 | 71 | 5 | 0 |
| 11/16 | 0 | 0 | 46 | 75 | 7 | 0 |
| 12/16 | 0 | 1 | 40 | 78 | 9 | 0 |
| 13/16 | 0 | 1 | 35 | 81 | 11 | 0 |
| 14/16 | 0 | 1 | 30 | 83 | 14 | 0 |
| 15/16 | 0 | −1 | 26 | 85 | 18 | 0 |

TABLE 2

Filter coefficients based on Catmull-Rom spline

| | (6-tap) interpolation filter coefficients | | | | | |
|---|---|---|---|---|---|---|
| phase | e[−2] | e[−1] | e[0] | e[1] | e[2] | e[3] |
| 0 | 0 | 0 | 128 | 0 | 0 | 0 |
| 1/16 | 0 | −4 | 127 | 5 | 0 | 0 |
| 2/16 | 0 | −6 | 123 | 12 | −1 | 0 |
| 3/16 | 0 | −8 | 118 | 20 | −2 | 0 |
| 4/16 | 0 | −9 | 111 | 29 | −3 | 0 |
| 5/16 | 0 | −9 | 103 | 39 | −5 | 0 |
| 6/16 | 0 | −9 | 93 | 50 | −6 | 0 |
| 7/16 | 0 | −9 | 83 | 61 | −7 | 0 |
| 8/16 | 0 | −8 | 72 | 72 | −8 | 0 |
| 9/16 | 0 | −7 | 61 | 83 | −9 | 0 |
| 10/16 | 0 | −6 | 50 | 93 | −9 | 0 |
| 11/16 | 0 | −5 | 39 | 103 | −9 | 0 |
| 12/16 | 0 | −3 | 29 | 111 | −9 | 0 |
| 13/16 | 0 | −2 | 20 | 118 | −8 | 0 |

TABLE 2-continued

Filter coefficients based on Catmull-Rom spline

| | (6-tap) interpolation filter coefficients | | | | | |
|---|---|---|---|---|---|---|
| phase | e[−2] | e[−1] | e[0] | e[1] | e[2] | e[3] |
| 14/16 | 0 | −1 | 12 | 123 | −6 | 0 |
| 15/16 | 0 | 0 | 5 | 127 | −4 | 0 |

TABLE 3

Filter coefficients based on the new 6-piece cubic Spline

| | (6-tap) interpolation filter coefficients | | | | | |
|---|---|---|---|---|---|---|
| phase | e[−2] | e[−1] | e[0] | e[1] | e[2] | e[3] |
| 0 | 0 | 0 | 128 | 0 | 0 | 0 |
| 1/16 | 1 | −6 | 127 | 7 | −2 | 1 |
| 2/16 | 2 | −10 | 124 | 15 | −4 | 1 |
| 3/16 | 3 | −13 | 119 | 24 | −6 | 1 |
| 4/16 | 4 | −16 | 113 | 34 | −8 | 1 |
| 5/16 | 4 | −17 | 105 | 45 | −11 | 2 |
| 6/16 | 4 | −17 | 97 | 56 | −13 | 1 |
| 7/16 | 4 | −17 | 87 | 66 | −15 | 3 |
| 8/16 | 3 | −16 | 77 | 77 | −16 | 3 |
| 9/16 | 3 | −15 | 66 | 87 | −17 | 4 |
| 10/16 | 1 | −13 | 56 | 97 | −17 | 4 |
| 11/16 | 2 | −11 | 45 | 105 | −17 | 4 |
| 12/16 | 1 | −8 | 34 | 113 | −16 | 4 |
| 13/16 | 1 | −6 | 24 | 119 | −13 | 3 |
| 14/16 | 1 | −4 | 15 | 124 | −10 | 2 |
| 15/16 | 1 | −2 | 7 | 127 | −6 | 1 |

4-Tap Cubic Spline Interpolation Filter

Comparing to the 6-tap filter, the advantage of the 4-tap filter is the lower complexity requirement. We have observed that by changing the constraints in the cubic functions, a new set of 4-tap filters can be derived with wider pass band than the Catmull-Rom filter.

A 4-piece spline function may be defined as:

$$f_{S4}(x) = \begin{cases} f_1(x) & |x| \le 1 \\ f_2(x) & 1 \le |x| \le 2 \\ 0 & \text{otherwise} \end{cases} \qquad (9)$$

By requiring the following conditions, $$f_1(0)=1, f_1(1)=0, f_2(2)=0$$

$$f_1'(0)=0, f_2'(2)=0,$$

$$f_1(1)=f_2(1), f_1'(1)=f_2'(1), f_1''(1)=f_2''(1) \qquad (10)$$

we can get the following solution for the 4-piece spline as an interpolation filter $$f_{S4}(x) = \frac{1}{4} \begin{cases} -5(1-|x|)^2 + 6(1-|x|)^2 + 3(1-|x|) & |x| \le 1 \\ 3(2-|x|)^3 - 3(2-|x|)^2 & 1 \le |x| \le 2 \\ 0 & \text{otherwise} \end{cases} \qquad (12)$$

For a relative phase offset position 0<=x<1, this kernel produces a 4-tap FIR filter with tap values given by the following matrix equation $$\frac{1}{4}*[1 \ x \ x^2 \ x^3]*\begin{bmatrix} 0 & 4 & 0 & 0 \\ -3 & 0 & 3 & 0 \\ 6 & -9 & 6 & -3 \\ -3 & 5 & -5 & 3 \end{bmatrix} \quad (13)$$

As shown in FIG. 4, the new cubic filter gives less-blurred signals than the Catmull-Rom filter although it still tends to blur more than the 6-tap filters. For example, at normalized frequency of 0.7, the new 4-tap filter is roughly 1 dB above the Catmull-Rom while roughly 1 dB below the new 6-tap cubic filter.

Table-4 shows the filter coefficients as fixed-point numbers for various phases. Some embodiments of the present invention may comprise an adaptive filter design as a weighted combination of several basis functions as shown in the following equation.

$$F_S(x) = b \cdot f_B(x) + c \cdot f_C(x) + s \cdot f_{S4}(x) \quad (13)$$

with (b+c+s)=1. And obviously, the new 4-tap filter can enable larger filter dynamic range in adaptive filter design than the Catmull-Rom case [1].

TABLE 4

Filter coefficients based on the new 4-piece cubic Spline

| phase | (4-tap) interpolation filter coefficients | | | |
|---|---|---|---|---|
| | e[−1] | e[0] | e[1] | e[2] |
| 0 | 0 | 128 | 0 | 0 |
| 1/16 | −5 | 127 | 7 | −1 |
| 2/16 | −9 | 124 | 15 | −2 |
| 3/16 | −12 | 119 | 24 | −3 |
| 4/16 | −14 | 113 | 34 | −5 |
| 5/16 | −14 | 105 | 44 | −7 |
| 6/16 | −14 | 96 | 55 | −9 |
| 7/16 | −13 | 86 | 65 | −10 |
| 8/16 | −12 | 76 | 76 | −12 |
| 9/16 | −10 | 65 | 86 | −13 |
| 10/16 | −9 | 55 | 96 | −14 |
| 11/16 | −7 | 44 | 105 | −14 |
| 12/16 | −5 | 34 | 113 | −14 |
| 13/16 | −3 | 24 | 119 | −12 |
| 14/16 | −2 | 15 | 124 | −9 |
| 15/16 | −1 | 7 | 127 | −5 |

In some embodiments, the 4-tap filter alone can be applied to upsampling of chroma signals to reduce the complexity while maintaining reasonable coding quality comparing to the current SVC design.

SVC Syntax

For SVC design embodiments, a signal may be sent to indicate whether the default upsampling filter should be applied or the adaptive filter derivation process be invoked. When the adaptive filter option is selected, the filter weighting parameters (s and/or c in Eq-8 or Eq-13) can be signaled in the slice header. In some embodiments, the weighting parameters can be signaled separately for vertical and horizontal directions.

In some embodiments, the parameters for luma and chroma channels can be signaled separately. For a luma channel, the filter definition is preferred to follow Eq-8. However, for chroma channel, there is certain benefit (in terms of reduced complexity) to apply Eq-13 (instead of Eq-8) so the upsampling filter is always 4-tap.

In some embodiments, depending on the frequency response of desired filters in a typical application, various combinations of the discussed filter functions can be defined and applied. In some downsampling embodiments, a weighted combination of several basis filter functions can also be applied. For embodiments with adaptive interpolation filter design in motion compensation, a weighted combination of these basis filter functions can also be applied.

In the current SVC extension of H.264, the 6-tap filters are derived from the Lanczos-3 function and defined in a pre-fixed filter table. Coding performances are reported here using a 4-tap cubic-spline based filter. The results show a degradation of 0.04 dB on average (and up to 0.09 dB) for all Intra picture coding. Coding results are also provided for the 4-tap Catmull-Rom (also cubic-spline based) filter, which gives a degradation of 0.09 dB on average (and up to 0.22 dB). The degradation in coding performance for typical long-delay configurations is negligible for both 4-tap cubic splines. The current JSVM downsampling filters are applied in all experiments. Embodiments of the present invention adopt the new spline-based filter (JVT-S016) for luma texture upsampling in order to reduce the computational complexity.

A new cubic-spline function is given in the following equation.

$$f_{S4}(x) = \frac{1}{4} \begin{cases} -5(1-|x|)^3 + 6(1-|x|)^2 + 3(1-|x|) & |x| \leq 1 \\ 3(2-|x|)^3 - 3(2-|x|)^2 & 1 \leq |x| \leq 2 \\ 0 & \text{otherwise} \end{cases} \quad (14)$$

For a relative phase offset position 0<=x<1, this kernel produces a 4-tap FIR filter with tap values given by the following matrix equation $$\frac{1}{4}*[1 \ x \ x^2 \ x^3]*\begin{bmatrix} 0 & 4 & 0 & 0 \\ -3 & 0 & 3 & 0 \\ 6 & -9 & 6 & -3 \\ -3 & 5 & -5 & 3 \end{bmatrix} \quad (15)$$

In some embodiments of the present invention, the filter coefficients are pre-calculated and stored in filter look-up tables as in Table-5 and Table-6. The normalization factor of the filters is 32, which is consistent with that of the current filter design. JVT-R066 outlined a basic procedure for deriving filter coefficients, which can be a good option for specific implementation.

TABLE 5

Filter coefficients derived from the 4-tap cubic spline function (JVT-S016)

| phase | (4-tap) interpolation filter coefficients | | | |
|---|---|---|---|---|
| | e[−1] | e[0] | e[1] | e[2] |
| 0 | 0 | 32 | 0 | 0 |
| 1/16 | −1 | 32 | 2 | −1 |
| 2/16 | −2 | 31 | 4 | −1 |
| 3/16 | −3 | 30 | 6 | −1 |
| 4/16 | −3 | 28 | 8 | −1 |
| 5/16 | −4 | 26 | 11 | −1 |
| 6/16 | −4 | 24 | 14 | −2 |
| 7/16 | −3 | 22 | 16 | −3 |
| 8/16 | −3 | 19 | 19 | −3 |
| 9/16 | −3 | 16 | 22 | −3 |
| 10/16 | −2 | 14 | 24 | −4 |
| 11/16 | −1 | 11 | 26 | −4 |
| 12/16 | −1 | 8 | 28 | −3 |

TABLE 5-continued

Filter coefficients derived from the 4-tap cubic spline function (JVT-S016)

| phase | (4-tap) interpolation filter coefficients | | | |
|---|---|---|---|---|
| | e[−1] | e[0] | e[1] | e[2] |
| 13/16 | −1 | 6 | 30 | −3 |
| 14/16 | −1 | 4 | 31 | −2 |
| 15/16 | −1 | 2 | 32 | −1 |

TABLE 6

Filter coefficients derived from the Catmull-Rom function (Eq. 2)

| phase | (4-tap) interpolation filter coefficients | | | |
|---|---|---|---|---|
| | e[−1] | e[0] | e[1] | e[2] |
| 0 | 0 | 32 | 0 | 0 |
| 1/16 | −1 | 32 | 1 | 0 |
| 2/16 | −2 | 31 | 3 | 0 |
| 3/16 | −2 | 30 | 5 | −1 |
| 4/16 | −2 | 28 | 7 | −1 |
| 5/16 | −2 | 26 | 10 | −2 |
| 6/16 | −2 | 23 | 12 | −1 |
| 7/16 | −2 | 21 | 15 | −2 |
| 8/16 | −2 | 18 | 18 | −2 |
| 9/16 | −2 | 15 | 21 | −2 |
| 10/16 | −1 | 12 | 23 | −2 |
| 11/16 | −2 | 10 | 26 | −2 |
| 12/16 | −1 | 7 | 28 | −2 |
| 13/16 | −1 | 5 | 30 | −2 |

TABLE 6-continued

Filter coefficients derived from the Catmull-Rom function (Eq. 2)

| phase | (4-tap) interpolation filter coefficients | | | |
|---|---|---|---|---|
| | e[−1] | e[0] | e[1] | e[2] |
| 14/16 | 0 | 3 | 31 | −2 |
| 15/16 | 0 | 1 | 32 | −1 |

All experimental results (except interlace coding tests) are based on the JSVM_5_9 software, which includes all ESS related adoptions in previous meetings. The current JSVM downsampling filters (based on Sine-windowed Sinc functions) are applied in all experiments.

Dyadic Spatial Scalability

Experiments are first conducted to compare the upsampling filters in ESS-dyadic coding performance.

All-Intra Configuration

For intra only configuration, the QP at base layer is set to 24, 30, and 36, respectively. The QP difference between a spatial layer and its immediate enhancement layer is "−4". As shown in Table 3, the degradations in coding performance are not very significant, with the average (of eight test sequences) at 0.04 dB for the JVT-S016 spline function and 0.09 dB for the Catmull-Rom spline. The average SNR differences are calculated based on the approach introduced in VCEG-M33 by Gisle Bjontegaard. Detailed experimental results are available in JVT-T0xx.xls. The average PSNR differences in Table 7 are calculated for the layer with the original (or highest) resolution.

TABLE 7

Performance difference for all-intra coding between the JSVM and the 4-tap spline-based upsampling filters (JVT-S016 and Catmull-Rom)

| | JVT-S016 - AVSNR3 Diff (dB) | | | Catmull-Rom - AVSNR3 Diff (dB) | | |
|---|---|---|---|---|---|---|
| Sequence | Y | U | V | Y | U | V |
| foreman | −0.043555 | −0.009994 | −0.014611 | −0.064375 | −0.025944 | −0.033252 |
| mobile | −0.039398 | −0.025131 | −0.025986 | −0.081435 | −0.048974 | −0.049447 |
| football | −0.041637 | −0.023558 | −0.015634 | −0.097833 | −0.057109 | −0.037388 |
| bus | −0.040364 | −0.017387 | −0.020848 | −0.084638 | −0.036064 | −0.044693 |
| city | −0.033961 | −0.011073 | −0.011883 | −0.070473 | −0.022914 | −0.023997 |
| crew | −0.018193 | −0.008956 | −0.014911 | −0.051573 | −0.025667 | −0.035182 |
| harbour | −0.087639 | −0.024016 | −0.027525 | −0.215199 | −0.051246 | −0.054835 |
| soccer | −0.02761 | −0.010284 | −0.011772 | −0.05243 | −0.027545 | −0.026955 |
| average | −0.041545 | −0.0163 | −0.017896 | −0.089744 | −0.036933 | −0.038219 |

Long-Delay Configuration

For typical long-delay configuration, the encoder parameters and rate points are based on the Spatial Scalability section in the common test conditions as defined in JVT-Q205. Additionally, "intra_period" is set to "64" for the 4CIF sequences or "32" for the CIF sequences. As shown in Table 8, the degradations in coding performance are negligible for both 4-tap spline functions.

TABLE 8

Performance difference for long-delay coding between the JSVM and the 4-tap spline-based upsampling filters (JVT-S016 and Catmull-Rom)

| | JVT-S016 - AVSNR3 Diff (dB) | | | Catmull-Rom - AVSNR3 Diff (dB) | | |
|---|---|---|---|---|---|---|
| Sequence | Y | U | V | Y | U | V |
| foreman | −0.004788 | −0.000632 | −0.003816 | −0.00005 | −0.00158 | −0.00349 |
| mobile | −0.008978 | −0.011228 | −0.006967 | −0.018419 | −0.014858 | −0.021194 |

TABLE 8-continued

Performance difference for long-delay coding between the JSVM and the 4-tap spline-based upsampling filters (JVT-S016 and Catmull-Rom)

| | JVT-S016 - AVSNR3 Diff (dB) | | | Catmull-Rom - AVSNR3 Diff (dB) | | |
|---|---|---|---|---|---|---|
| Sequence | Y | U | V | Y | U | V |
| football | −0.01598 | −0.006016 | −0.009328 | −0.035644 | −0.039114 | −0.027689 |
| bus | −0.031353 | −0.177173 | −0.191099 | −0.033227 | −0.168747 | −0.185026 |
| city | −0.011352 | −0.000202 | 0.008312 | −0.02638 | −0.021324 | −0.015558 |
| crew | −0.002897 | 0.003348 | −0.004933 | −0.006622 | 0.002057 | −0.012334 |
| harbour | −0.013783 | −0.010567 | −0.004851 | −0.03954 | −0.008116 | −0.013657 |
| soccer | −0.01379 | −0.001521 | 0.004638 | −0.02092 | −0.000222 | −0.00115 |
| average | −0.012864 | −0.025499 | −0.026005 | −0.0226 | −0.031487 | −0.035012 |

Non-Dyadic Spatial Scalability

For ESS non-dyadic tests, the picture resolutions and encoder parameters and rate points for the long-delay configurations are based on the earlier ESS core experiments (as in Poznan and Nice meetings). Additionally, various combinations of scaling ratios and picture QP's are tested for all-intra configuration.

The results for the all-intra configuration are summarized in Table-9, which indicates no significant difference in coding performance. The luma PSNR was improved by 0.009 dB while the bitrate increased by 0.29%.

The results for the long-delay configuration are summarized in Table-10, which also indicates no significant difference in coding performance. The luma PSNR dropped 0.015 dB.

Interlace Coding

Experiments are also conducted following the test conditions defined in CE2 for interlace SVC. The software distributed among the CE participants was used for the tests. The results are summarized in Table-11 for the four test configurations defined in CE2. Similar to the non-interlace ESS tests, no significant difference in coding performance is observed either for interlace coding configurations.

TABLE 9

Performance difference for all-intra coding between the JSVM and the 4-tap spline-based upsampling filter (JVT-S016) for non-dyadic tests

| | | | | | Layer-1 PSNR (Y) | | | Layer-1 PSNR (U) | | |
|---|---|---|---|---|---|---|---|---|---|---|
| Sequence | Scaling Ratio | Layer ID | Resolution | QP | JSVM | S016 | Diff | JSVM | S016 | Diff |
| City | Adaptive [1.0, 2.0] | 0 | CIF | 24 | 37.190 | 37.183 | −0.007 | 43.117 | 43.116 | 0.000 |
| | | 1 | 4CIF | 28 | | | | | | |
| | 4/3 | 0 | 528 × 432 | 28 | 34.519 | 34.520 | 0.001 | 42.082 | 42.082 | 0.000 |
| | | 1 | 4CIF | 32 | | | | | | |
| | 3/2 | 0 | 448 × 384 | 32 | 31.803 | 31.814 | 0.011 | 40.731 | 40.731 | 0.000 |
| | | 1 | 672 × 576 | 36 | | | | | | |
| | 5/3 | 0 | 384 × 336 | 36 | 28.806 | 28.806 | 0.000 | 39.632 | 39.632 | 0.000 |
| | | 1 | 640-560 | 41 | | | | | | |
| Crew | Adaptive [1.0, 2.0] | 0 | CIF | 24 | 39.098 | 39.095 | −0.003 | 42.111 | 42.110 | 0.000 |
| | | 1 | 4CIF | 28 | | | | | | |
| | 4/3 | 0 | 528 × 432 | 28 | 37.362 | 37.371 | 0.009 | 41.281 | 41.280 | 0.000 |
| | | 1 | 4CIF | 32 | | | | | | |
| | 3/2 | 0 | 448 × 384 | 32 | 35.115 | 35.139 | 0.024 | 39.776 | 39.776 | 0.000 |
| | | 1 | 672 × 576 | 36 | | | | | | |
| | 5/3 | 0 | 384 × 336 | 36 | 32.645 | 32.654 | 0.009 | 38.378 | 38.378 | 0.000 |
| | | 1 | 640-560 | 41 | | | | | | |
| Harbour | 4/3 | 0 | 528 × 432 | 28 | 35.079 | 35.066 | −0.012 | 41.698 | 41.698 | 0.000 |
| | | 1 | 4CIF | 32 | | | | | | |
| | 3/2 | 0 | 448 × 384 | 32 | 32.231 | 32.294 | 0.063 | 40.341 | 40.343 | 0.002 |
| | | 1 | 672 × 576 | 36 | | | | | | |
| | 5/3 | 0 | 384 × 336 | 36 | 29.014 | 29.006 | −0.008 | 39.162 | 39.164 | 0.001 |
| | | 1 | 640-560 | 41 | | | | | | |
| Soccer | 4/3 | 0 | 528 × 432 | 28 | 35.987 | 35.997 | 0.010 | 42.958 | 42.957 | −0.001 |
| | | 1 | 4CIF | 32 | | | | | | |
| | 3/2 | 0 | 448 × 384 | 32 | 33.484 | 33.502 | 0.017 | 41.375 | 41.375 | 0.000 |
| | | 1 | 672 × 576 | 36 | | | | | | |
| | 5/3 | 0 | 384 × 336 | 36 | 31.055 | 31.061 | 0.006 | 39.814 | 39.813 | 0.000 |
| | | 1 | 640-560 | 41 | | | | | | |
| Average | | | | | | | 0.009 | | | 0.000 |

| | Layer-1 PSNR (V) | | | bitrate (Mbps) | | |
|---|---|---|---|---|---|---|
| Sequence | JSVM | S016 | Diff | JSVM | S016 | Diff % |
| City | 45.062 | 45.062 | 0.000 | 116.930 | 117.460 | 0.45% |
| | 44.298 | 44.298 | 0.000 | 81.300 | 81.500 | 0.25% |
| | 43.039 | 43.039 | 0.000 | 44.080 | 44.400 | 0.73% |
| | 41.766 | 41.766 | 0.000 | 19.580 | 19.680 | 0.51% |

TABLE 9-continued

Performance difference for all-intra coding between the JSVM and the 4-tap spline-based upsampling filter (JVT-S016) for non-dyadic tests

|  |  |  |  |  |  |  |
|---|---|---|---|---|---|---|
| Crew | 42.859 | 42.859 | 0.000 | 55.720 | 55.910 | 0.34% |
|  | 41.734 | 41.733 | −0.001 | 37.080 | 37.070 | −0.03% |
|  | 39.692 | 39.691 | −0.001 | 20.790 | 20.800 | 0.05% |
|  | 37.894 | 37.894 | 0.000 | 10.710 | 10.710 | 0.00% |
| Harbour | 43.724 | 43.724 | 0.000 | 83.780 | 83.940 | 0.19% |
|  | 42.175 | 42.177 | 0.002 | 47.810 | 48.200 | 0.82% |
|  | 40.716 | 40.717 | 0.001 | 23.940 | 24.030 | 0.38% |
| Soccer | 44.823 | 44.823 | −0.001 | 50.680 | 50.680 | 0.00% |
|  | 43.112 | 43.112 | 0.000 | 24.880 | 24.940 | 0.24% |
|  | 41.823 | 41.823 | 0.000 | 10.200 | 10.220 | 0.20% |
| Average |  |  | 0.000 |  |  | 0.29% |

TABLE 10

Performance difference for long-delay coding between the JSVM and the 4-tap spline-based upsampling filter (NT-S016) for non-dyadic tests

| Sequence | Scaling Ratio | Layer ID | Resolution | Bitrate (kbps) | Layer-1 PSNR (Y) JSVM | S016 | Diff | Layer-1 PSNR (U) JSVM | S016 | Diff | Layer-1 PSNR (V) JSVM | S016 | Diff |
|---|---|---|---|---|---|---|---|---|---|---|---|---|---|
| City | Adaptive [1.0, 2.0] | 0 | CIF | 384 | 34.015 | 34.011 | −0.004 | 42.483 | 42.480 | −0.004 | 44.736 | 44.737 | 0.001 |
|  |  | 1 | 4CIF | 1024 |  |  |  |  |  |  |  |  |  |
|  | 4/3 | 0 | 528 × 432 | 810 | 33.080 | 33.079 | −0.001 | 42.745 | 42.747 | 0.001 | 45.423 | 45.420 | −0.003 |
|  |  | 1 | 4CIF | 1024 |  |  |  |  |  |  |  |  |  |
|  | 3/2 | 0 | 448 × 384 | 720 | 33.648 | 33.633 | −0.014 | 42.748 | 42.746 | −0.002 | 45.348 | 45.345 | −0.002 |
|  |  | 1 | 672 × 576 | 1000 |  |  |  |  |  |  |  |  |  |
|  | 5/3 | 0 | 384 × 336 | 610 | 33.991 | 33.816 | −0.174 | 42.684 | 42.557 | −0.127 | 45.278 | 45.203 | −0.075 |
|  |  | 1 | 640-560 | 980 |  |  |  |  |  |  |  |  |  |
| Crew | Adaptive [1.0, 2.0] | 0 | CIF | 384 | 35.631 | 35.625 | −0.006 | 40.667 | 40.664 | −0.004 | 40.923 | 40.919 | −0.004 |
|  |  | 1 | 4CIF | 1500 |  |  |  |  |  |  |  |  |  |
|  | 4/3 | 0 | 528 × 432 | 1190 | 35.362 | 35.368 | 0.006 | 40.408 | 40.708 | 0.300 | 40.891 | 40.888 | −0.003 |
|  |  | 1 | 4CIF | 1500 |  |  |  |  |  |  |  |  |  |
|  | 3/2 | 0 | 448 × 384 | 1050 | 35.730 | 35.744 | 0.014 | 40.809 | 40.808 | 0.000 | 41.117 | 41.117 | 0.000 |
|  |  | 1 | 672 × 576 | 1470 |  |  |  |  |  |  |  |  |  |
|  | 5/3 | 0 | 384 × 336 | 890 | 35.644 | 35.644 | 0.001 | 40.664 | 40.662 | −0.002 | 40.957 | 40.957 | 0.000 |
|  |  | 1 | 640-560 | 1430 |  |  |  |  |  |  |  |  |  |
| Harbour | 4/3 | 0 | 528 × 432 | 1190 | 30.958 | 30.962 | 0.004 | 41.470 | 41.470 | 0.000 | 43.581 | 43.580 | −0.001 |
|  |  | 1 | 4CIF | 1500 |  |  |  |  |  |  |  |  |  |
|  | 3/2 | 0 | 448 × 384 | 1050 | 31.635 | 31.635 | 0.000 | 41.860 | 41.862 | 0.002 | 43.848 | 43.848 | 0.000 |
|  |  | 1 | 672 × 576 | 1470 |  |  |  |  |  |  |  |  |  |
|  | 5/3 | 0 | 384 × 336 | 890 | 31.733 | 31.721 | −0.013 | 41.860 | 41.856 | −0.004 | 43.891 | 43.892 | 0.001 |
|  |  | 1 | 640-560 | 1430 |  |  |  |  |  |  |  |  |  |
| Soccer | 4/3 | 0 | 528 × 432 | 1190 | 34.351 | 34.359 | 0.008 | 42.780 | 42.785 | 0.005 | 44.896 | 44.895 | −0.001 |
|  |  | 1 | 4CIF | 1500 |  |  |  |  |  |  |  |  |  |
|  | 3/2 | 0 | 448 × 384 | 1050 | 35.074 | 35.044 | −0.030 | 42.947 | 42.921 | −0.026 | 45.062 | 45.040 | −0.022 |
|  |  | 1 | 672 × 576 | 1470 |  |  |  |  |  |  |  |  |  |
|  | 5/3 | 0 | 384 × 336 | 890 | 35.139 | 35.142 | 0.003 | 42.855 | 42.854 | −0.001 | 44.956 | 44.956 | 0.000 |
|  |  | 1 | 640-560 | 1430 |  |  |  |  |  |  |  |  |  |
| Average |  |  |  |  |  |  | −0.015 |  |  | 0.010 |  |  | −0.008 |

TABLE 11

Performance difference between the JSVM and the 4-tap spline-based upsampling filter (JVT-S016) for 4 different interlace coding configurations

| sequence | BL rate point | CFG-1 AVSNR Diff (dB) Y | U | V | sequence | BL rate point | CFG-2 AVSNR Diff (dB) Y | U | V |
|---|---|---|---|---|---|---|---|---|---|
| CANOA | 384 | 0.000 | −0.001 | −0.003 | CREW | 512 | −0.007 | 0.020 | −0.003 |
|  | 512 | 0.009 | 0.004 | 0.000 |  | 768 | −0.010 | −0.009 | −0.008 |
|  | 768 | 0.019 | 0.004 | 0.010 |  | 1024 | −0.009 | −0.001 | −0.025 |
| F1_CAR | 384 | 0.002 | 0.006 | −0.001 | Soccer | 512 | −0.023 | −0.003 | −0.017 |
|  | 512 | 0.001 | −0.005 | 0.003 |  | 768 | 0.030 | 0.016 | 0.017 |
|  | 768 | −0.001 | 0.008 | 0.011 |  | 1024 | −0.001 | −0.003 | 0.000 |

TABLE 11-continued

Performance difference between the JSVM and the 4-tap spline-based upsampling filter (JVT-S016) for 4 different interlace coding configurations

| MOBILE | 384 | 0.012 | 0.019 | 0.020 | Parkrun | 768 | −0.005 | −0.001 | 0.003 |
|---|---|---|---|---|---|---|---|---|---|
| | 512 | 0.009 | 0.009 | 0.020 | | 1024 | −0.007 | −0.006 | −0.002 |
| | 768 | 0.005 | 0.009 | 0.018 | | 1532 | −0.009 | −0.001 | −0.005 |
| Average | | 0.006 | 0.006 | 0.009 | Average | | −0.005 | 0.001 | −0.004 |

| sequence | BL rate point | CFG-3 AVSNR Diff (dB) | | | sequence | BL rate point | CFG-4 AVSNR Diff (dB) | | |
|---|---|---|---|---|---|---|---|---|---|
| | | Y | U | V | | | Y | U | V |
| CREW | 1280 | −0.005 | 0.002 | 0.003 | CANOA | 384 | 0.024 | 0.000 | −0.033 |
| | 1792 | −0.002 | 0.006 | −0.007 | | 512 | 0.000 | 0.010 | 0.008 |
| | 2560 | −0.001 | 0.001 | −0.007 | | 768 | −0.007 | −0.006 | −0.022 |
| Soccer | 1280 | −0.015 | 0.001 | −0.001 | F1_CAR | 384 | 0.000 | 0.002 | −0.002 |
| | 1792 | −0.015 | −0.005 | −0.009 | | 512 | −0.004 | 0.004 | −0.002 |
| | 2560 | −0.013 | 0.003 | −0.008 | | 768 | −0.004 | −0.002 | 0.004 |
| Parkrun | 1792 | −0.004 | −0.003 | 0.001 | MOBILE | 384 | −0.009 | −0.016 | 0.007 |
| | 2560 | −0.006 | −0.003 | −0.002 | | 512 | −0.008 | −0.008 | −0.011 |
| | 3072 | −0.008 | −0.002 | −0.002 | | 768 | −0.008 | −0.001 | −0.003 |
| Average | | −0.008 | 0.000 | −0.003 | Average | | −0.002 | −0.002 | −0.006 |

Coding performances are reported for the 4-tap cubic-spline based filter introduced in JVT-S016. The results show a degradation of 0.04 dB on average for all-Intra picture coding. The degradation in coding performance for typical long-delay configurations (including interlace configurations) is negligible. During the experiments, no significant visual quality degradation is observed. Embodiments of the present invention comprise a new spline-based filter as described in JVT-S016 and Table-5) for luma texture upsampling in order to reduce the computational complexity of the texture upsampling process.

The terms and expressions which have been employed in the forgoing specification are used therein as terms of description and not of limitation, and there is no intention in the use of such terms and expressions of excluding equivalence of the features shown and described or portions thereof.

I claim:

1. A method for picture up-sampling from a lower resolution picture to a higher resolution picture said method comprising:
   a) determining a lower resolution picture location corresponding to a sample position in said higher resolution picture;
   b) determining a phase offset position for said lower resolution picture location, wherein said phase offset position denotes the position of said lower resolution picture location relative to said sample position in said higher resolution picture;
   c) selecting a first filter coefficient for a first interpolation filter based on said phase offset position;
   d) selecting a second filter coefficient for a second interpolation filter;
   e) selecting a weighting factor to control the relative influence of said first interpolation filter and said second interpolation filter; and
   f) calculating a picture value for said sample position using a weighted combination of said first interpolation filter and said second interpolation filter, said weighted combination being controlled by said weighting factor.

2. A method as described in claim 1 wherein said second filter coefficient is selected based on said phase offset position.

3. A method as described in claim 1 wherein said selecting a weighting factor is based on image noise.

4. A method as described in claim 1 wherein said selecting a weighting factor is based on proximity to an image block boundary.

5. A method as described in claim 1 wherein said first interpolation filter and said second interpolation filter are controlled by separate weighting factors.

6. A method as described in claim 1 wherein one of said first interpolation filter and said second interpolation filter is a 4-tap filter based on a 4-piece cubic spline.

7. A method as described in claim 1 wherein said first interpolation filter is a 4-tap filter based on a 4-piece cubic spline and said second interpolation filter is derived from the Catmull-Rom function.

8. A method as described in claim 1 wherein said phase offset position and said first and second filter coefficients are determined and selected independently for a horizontal direction and a vertical direction.

9. A method as described in claim 1 wherein one of said first interpolation filter and said second interpolation filter is a 4-tap filter with coefficients defined by the following table:

| phase | (4-tap) interpolation filter coefficients | | | |
|---|---|---|---|---|
| | e[−1] | e[0] | e[1] | e[2] |
| 0 | 0 | 32 | 0 | 0 |
| 1/16 | −1 | 32 | 2 | −1 |
| 2/16 | −2 | 31 | 4 | −1 |
| 3/16 | −3 | 30 | 6 | −1 |
| 4/16 | −3 | 28 | 8 | −1 |
| 5/16 | −4 | 26 | 11 | −1 |
| 6/16 | −4 | 24 | 14 | −2 |
| 7/16 | −3 | 22 | 16 | −3 |
| 8/16 | −3 | 19 | 19 | −3 |
| 9/16 | −3 | 16 | 22 | −3 |
| 10/16 | −2 | 14 | 24 | −4 |
| 11/16 | −1 | 11 | 26 | −4 |
| 12/16 | −1 | 8 | 28 | −3 |
| 13/16 | −1 | 6 | 30 | −3 |
| 14/16 | −1 | 4 | 31 | −2 |
| 15/16 | −1 | 2 | 32 | −1. |

10. A method as described in claim 1 wherein one of said first interpolation filter and said second interpolation filter is a 4-tap FIR filter with tap values given by the following matrix equation:

$$\frac{1}{4} * [1 \quad x \quad x^2 \quad x^3] * \begin{bmatrix} 0 & 4 & 0 & 0 \\ -3 & 0 & 3 & 0 \\ 6 & -9 & 6 & -3 \\ -3 & 5 & -5 & 3 \end{bmatrix}$$

wherein said phase offset position is defined as x, where $0 \leq x < 1$.

11. A method for picture up-sampling from a lower resolution picture to a higher resolution picture said method comprising:
   a) determining a lower resolution picture location corresponding to a sample position in said higher resolution picture;
   b) determining a phase offset position for said lower resolution picture location, wherein said phase offset position denotes the position of said lower resolution picture location relative to said sample position in said higher resolution picture;
   c) selecting a first filter coefficient for a first interpolation filter;
   d) selecting a second filter coefficient for a second interpolation filter;
   e) selecting a third filter coefficient for a third interpolation filter;
   f) selecting at least one weighting factor to control the relative influence of said first interpolation filter, said second interpolation filter and said third interpolation filter; and
   g) calculating a picture value for said sample position using a weighted combination of said first interpolation filter, said second interpolation filter and said third interpolation filter, said weighted combination being controlled by said at least one weighting factor.

12. A method as described in claim 11 wherein one of said first interpolation filter, said second interpolation filter and said third interpolation filter is a 4-tap filter based on a 4-piece cubic spline.

13. A method as described in claim 11 wherein one of said first interpolation filter, said second interpolation filter and said third interpolation filter is a 4-tap FIR filter with tap values given by the following matrix equation $$\frac{1}{4} * [1 \quad x \quad x^2 \quad x^3] * \begin{bmatrix} 0 & 4 & 0 & 0 \\ -3 & 0 & 3 & 0 \\ 6 & -9 & 6 & -3 \\ -3 & 5 & -5 & 3 \end{bmatrix}$$

wherein said phase offset position is defined as x, where $0 \leq x < 1$.

14. A method as described in claim 11 wherein one of said first interpolation filter, said second interpolation filter and said third interpolation filter is a 4-tap filter with phase-related coefficients taken from the following table:

| phase | (4-tap) interpolation filter coefficients | | | |
|---|---|---|---|---|
| | e[−1] | e[0] | e[1] | e[2] |
| 0 | 0 | 32 | 0 | 0 |
| 1/16 | −1 | 32 | 2 | −1 |

-continued

| phase | (4-tap) interpolation filter coefficients | | | |
|---|---|---|---|---|
| | e[−1] | e[0] | e[1] | e[2] |
| 2/16 | −2 | 31 | 4 | −1 |
| 3/16 | −3 | 30 | 6 | −1 |
| 4/16 | −3 | 28 | 8 | −1 |
| 5/16 | −4 | 26 | 11 | −1 |
| 6/16 | −4 | 24 | 14 | −2 |
| 7/16 | −3 | 22 | 16 | −3 |
| 8/16 | −3 | 19 | 19 | −3 |
| 9/16 | −3 | 16 | 22 | −3 |
| 10/16 | −2 | 14 | 24 | −4 |
| 11/16 | −1 | 11 | 26 | −4 |
| 12/16 | −1 | 8 | 28 | −3 |
| 13/16 | −1 | 6 | 30 | −3 |
| 14/16 | −1 | 4 | 31 | −2 |
| 15/16 | −1 | 2 | 32 | −1. |

15. A method as described in claim 11 wherein one of said first interpolation filter, said second interpolation filter and said third interpolation filter is a 4-tap filter with phase-related coefficients taken from the following table:

| phase | (4-tap) interpolation filter coefficients | | | |
|---|---|---|---|---|
| | e[−1] | e[0] | e[1] | e[2] |
| 0 | 0 | 128 | 0 | 0 |
| 1/16 | −5 | 127 | 7 | −1 |
| 2/16 | −9 | 124 | 15 | −2 |
| 3/16 | −12 | 119 | 24 | −3 |
| 4/16 | −14 | 113 | 34 | −5 |
| 5/16 | −14 | 105 | 44 | −7 |
| 6/16 | −14 | 96 | 55 | −9 |
| 7/16 | −13 | 86 | 65 | −10 |
| 8/16 | −12 | 76 | 76 | −12 |
| 9/16 | −10 | 65 | 86 | −13 |
| 10/16 | −9 | 55 | 96 | −14 |
| 11/16 | −7 | 44 | 105 | −14 |
| 12/16 | −5 | 34 | 113 | −14 |
| 13/16 | −3 | 24 | 119 | −12 |
| 14/16 | −2 | 15 | 124 | −9 |
| 15/16 | −1 | 7 | 127 | −5. |

16. A method as described in claim 11 wherein one of said first interpolation filter, said second interpolation filter and said third interpolation filter is a 6-tap filter with phase-related coefficients taken from the following table:

| phase | (6-tap) interpolation filter coefficients | | | | | |
|---|---|---|---|---|---|---|
| | e[−2] | e[−1] | e[0] | e[1] | e[2] | e[3] |
| 0 | 0 | 0 | 128 | 0 | 0 | 0 |
| 1/16 | 1 | −6 | 127 | 7 | −2 | 1 |
| 2/16 | 2 | −10 | 124 | 15 | −4 | 1 |
| 3/16 | 3 | −13 | 119 | 24 | −6 | 1 |
| 4/16 | 4 | −16 | 113 | 34 | −8 | 1 |
| 5/16 | 4 | −17 | 105 | 45 | −11 | 2 |
| 6/16 | 4 | −17 | 97 | 56 | −13 | 1 |
| 7/16 | 4 | −17 | 87 | 66 | −15 | 3 |
| 8/16 | 3 | −16 | 77 | 77 | −16 | 3 |
| 9/16 | 3 | −15 | 66 | 87 | −17 | 4 |
| 10/16 | 1 | −13 | 56 | 97 | −17 | 4 |
| 11/16 | 2 | −11 | 45 | 105 | −17 | 4 |
| 12/16 | 1 | −8 | 34 | 113 | −16 | 4 |
| 13/16 | 1 | −6 | 24 | 119 | −13 | 3 |

-continued (6-tap) interpolation filter coefficients

| phase | e[−2] | e[−1] | e[0] | e[1] | e[2] | e[3] |
|---|---|---|---|---|---|---|
| 14/16 | 1 | −4 | 15 | 124 | −10 | 2 |
| 15/16 | 1 | −2 | 7 | 127 | −6 | 1. |

17. A method as described in claim 11 wherein said first interpolation filter is a 4-tap filter based on a 4-piece cubic spline and said second interpolation filter is derived from the Catmull-Rom function.

18. A method as described in claim 11 wherein said first interpolation filter is a 4-tap filter based on a 4-piece cubic spline, said second interpolation filter is derived from the Catmull-Rom function and said third interpolation filter is a 6-tap filter based on a 6-piece cubic spline.

19. A method as described in claim 11 wherein said first interpolation filter is a 4-tap filter with phase-related coefficients taken from the Table I below:

TABLE I (4-tap) interpolation filter coefficients

| phase | e[−1] | e[0] | e[1] | e[2] |
|---|---|---|---|---|
| 0 | 0 | 32 | 0 | 0 |
| 1/16 | −1 | 32 | 2 | −1 |
| 2/16 | −2 | 31 | 4 | −1 |
| 3/16 | −3 | 30 | 6 | −1 |
| 4/16 | −3 | 28 | 8 | −1 |
| 5/16 | −4 | 26 | 11 | −1 |
| 6/16 | −4 | 24 | 14 | −2 |
| 7/16 | −3 | 22 | 16 | −3 |
| 8/16 | −3 | 19 | 19 | −3 |
| 9/16 | −3 | 16 | 22 | −3 |
| 10/16 | −2 | 14 | 24 | −4 |
| 11/16 | −1 | 11 | 26 | −4 |
| 12/16 | −1 | 8 | 28 | −3 |
| 13/16 | −1 | 6 | 30 | −3 |
| 14/16 | −1 | 4 | 31 | −2 |
| 15/16 | −1 | 2 | 32 | −1, | wherein said second interpolation filter is derived from the Catmull-Rom function and said third interpolation filter is a 6-tap filter with phase-related coefficients taken from the Table II below:

TABLE II (6-tap) interpolation filter coefficients

| phase | e[−2] | e[−1] | e[0] | e[1] | e[2] | e[3] |
|---|---|---|---|---|---|---|
| 0 | 0 | 0 | 128 | 0 | 0 | 0 |
| 1/16 | 1 | −6 | 127 | 7 | −2 | 1 |
| 2/16 | 2 | −10 | 124 | 15 | −4 | 1 |
| 3/16 | 3 | −13 | 119 | 24 | −6 | 1 |
| 4/16 | 4 | −16 | 113 | 34 | −8 | 1 |
| 5/16 | 4 | −17 | 105 | 45 | −11 | 2 |
| 6/16 | 4 | −17 | 97 | 56 | −13 | 1 |
| 7/16 | 4 | −17 | 87 | 66 | −15 | 3 |
| 8/16 | 3 | −16 | 77 | 77 | −16 | 3 |
| 9/16 | 3 | −15 | 66 | 87 | −17 | 4 |
| 10/16 | 1 | −13 | 56 | 97 | −17 | 4 |
| 11/16 | 2 | −11 | 45 | 105 | −17 | 4 |
| 12/16 | 1 | −8 | 34 | 113 | −16 | 4 |
| 13/16 | 1 | −6 | 24 | 119 | −13 | 3 |
| 14/16 | 1 | −4 | 15 | 124 | −10 | 2 |
| 15/16 | 1 | −2 | 7 | 127 | −6 | 1. |

20. A system for picture up-sampling from a lower resolution picture to a higher resolution picture said system comprising:
 a position processor for determining a lower resolution picture location corresponding to a sample position in said higher resolution picture;
 a phase calculator for determining a phase offset position for said lower resolution picture location, wherein said phase offset position denotes the position of said lower resolution picture location relative to said sample position in said higher resolution picture;
 a first interpolation filter;
 a second interpolation filter;
 a first coefficient selector for selecting a first filter coefficient for said first interpolation filter based on said phase offset position;
 a second coefficient selector selecting a second filter coefficient for said second interpolation filter;
 a weighting factor calculator for selecting a weighting factor to control the relative influence of said first interpolation filter and said second interpolation filter; and
 a filter application for calculating a picture value for said sample position using a weighted combination of said first interpolation filter and said second interpolation filter, said weighted combination being controlled by said weighting factor.

* * * * *